United States Patent [19]

Levy

[11] 3,875,090

[45] Apr. 1, 1975

[54] IMPACT AND ABRASION RESISTANT COATING COMPOSITION

[75] Inventor: Stanley S. Levy, North Caldwell, N.J.

[73] Assignee: N L Industries, Inc., New York, N.Y.

[22] Filed: May 22, 1974

[21] Appl. No.: 472,078

Related U.S. Application Data

[63] Continuation-in-part of Ser. No. 363,732, May 24, 1973, abandoned.

[52] U.S. Cl.......... 260/22 TN, 117/125, 117/132 B, 117/132 BS, 117/148, 117/161 KP, 260/22 CB, 260/22 S, 260/23 P, 260/23 TN, 260/33.6 UB, 260/77.5 R, 260/77.5 TB
[51] Int. Cl.......................... C08g 41/04, C09d 3/72
[58] Field of Search ... 260/22 TN, 77.5 R, 77.5 TB; 117/161 KP

[56] References Cited
UNITED STATES PATENTS

| | | | |
|---|---|---|---|
| 2,512,726 | 6/1950 | Penn et al. | 260/19 UA |
| 3,293,728 | 12/1966 | Hill | 260/22 TN |
| 3,346,524 | 10/1967 | Skreckoski | 260/22 TN |
| 3,403,721 | 10/1968 | Robins et al. | 260/22 TN |
| 3,642,936 | 2/1972 | Hodge et al. | 260/827 |
| 3,748,294 | 7/1973 | Kershaw et al. | 260/22 TN |

FOREIGN PATENTS OR APPLICATIONS 1,182,884  3/1970  United Kingdom .......... 260/77.5 R

*Primary Examiner*—Ronald W. Griffin

[57] ABSTRACT

A high impact and abrasion resistant coating composition is described comprising a mixture of a partially hydrolyzed vinyl chloride-vinyl acetate copolymer, an alkyd and an isocyanate terminated urethane prepolymer. The composition is cured at ambient temperatures to form a urethane reaction product.

20 Claims, No Drawings

IMPACT AND ABRASION RESISTANT COATING COMPOSITION

BACKGROUND OF THE INVENTION

This application is a continuation-in-part of my co-pending application Ser. No. 363,732, filed May 24, 1973, now abandoned.

This invention is concerned with a novel coating composition which can be cured at ambient temperatures to form a durable, adhesive, impact resistant and abrasive resistant coating on metallic, wood and cementitious substrates.

In the past, various coatings which are cured under ambient conditions such as alkyd, acrylic, epoxy, urethane and vinyl coatings have been used for the protection of metal surfaces where high durability is required as for example maintenance coatings or for freight moving vehicles. However, these coatings generally fail where coating properties such as high impact and abrasion resistance are required. Modification of these systems to increase crosslinking such as when thermosetting resins such as urea-formaldehyde or melamine-formaldehyde are reacted with functional acrylic polymers may sometimes improve abrasion resistance, but reduce flexibility of the coatings. Conversely, abrasion resistance may be poor although the film will have considerable flexibility. In addition, many of these systems require primers or anti-corrosive pigments depending on the particular metal substrate in order to prevent corrosion or require high film thicknesses of as much as 10 mils to maintain resistance to an industrial atmosphere.

The vinyl coatings which include polymers and copolymers of ethylene, styrene, acrylic esters and vinyl chloride are extremely inert to chemical environments. However, because they are thermoplastic they cannot be used on surfaces which attain a temperature of 150°F or higher. In addition they generally require more than 2 days curing for sufficient release of solvents in order to develop their coating properties.

Coal tar epoxy coatings do not usually require primer coatings but must be applied in thick films of about 10 mils to perform satisfactorily. Coating compositions containing alkyd baking enamels or thermosetting acrylics require curing at elevated temperatures after application which renders them costly to the user.

The instant invention provides a coating composition which can be rapidly cured at ambient temperatures to form a durable coating on most any surface. The coating has excellent adhesion, abrasion resistance and impact resistance. The composition can be applied as a clear coating or a pigmented coating by the addition of a pigment such as titanium dioxide. In another embodiment of this invention special solvents are added to the coating composition which allows for spraying a film of the composition on to substrate surfaces and which also allows efficient release of air bubbles from the film formed on the substrate surfaces during curing.

It is an object of this invention to provide a clear or pigmented, durable, adhesive, impact resistant and abrasion resistant cured coating.

It is an even further object of this invention to provide a coating composition which can be applied to substrates by spraying.

SUMMARY OF THE INVENTION

The instant invention comprises a self-priming polyvinyl chloride-acetate based polyurethane coating composition which is rapidly cured at ambient temperatures to provide a durable, adhesive, impact resistant and abrasion resistant coating for substrates such as wood, metal and cementitious materials. Curing of the composition is generally complete within about 48 hours. Adhesion to sandblasted steel, cold-rolled steel, magnesium, wood and cementitious substrates is excellent. Impact resistance of these coated substrates as measured by reverse impact tests have shown values of 160 inch-pounds which is unusually high for urethane-type coatings.

The coating composition is divided into two components; a functional polymer component and a urethane prepolymer component. The functional polymer component comprises polymeric resins containing pendant hydroxyl groups which are capable of reaction with isocyanate groups. The urethane prepolymer component is an elastomeric isocyanate-terminated urethane prepolymer. The functional polymer component may also contain solvents to aid in mixing the polymeric resins and to adjust the viscosity of the coating composition. Upon mixing the two components a reaction begins between the reactive hydrogen groups of the functional polymer component and the isocyanate groups of the urethane prepolymer. After mixing the components, the so-formed composition is then applied to a substrate as for example by brushing, rolling or dipping. The composition is then cured at ambient temperatures for about 48 hours during which time any solvents which are present are evaporated and a cured polyurethane coating is formed comprising the reaction product of the polymeric resins and urethane prepolymer.

The cured coating is durable, adhesive to the substrate, and is both impact and abrasion resistant. In addition to such properties, the coating may also provide corrosion assistance and sound deadening properties to a substrate, such as the undercarriage of a car or other types of vehicles.

The polymeric resins in the functional polymer component comprise a partially hydrolyzed vinyl chloride-vinyl acetate copolymer and an alkyd resin. The vinyl chloride-vinyl acetate copolymer has been partially hydrolyzed to convert some of the combined vinyl acetate groups to vinyl alcohol groups.

These vinyl alcohol groups are preferably present in an amount of from 2 to 20% of the weight of the copolymer. For purposes of convenience this copolymer will be hereinafter referred to as the vinyl copolymer.

The alkyd resin in the functional polymer component is a saturated or unsaturated alkyd resin containing at least 1% by weight of hydroxyl groups and having a molecular weight of at least 1000.

The functional polymer component may optionally contain a high molecular weight silicone polymer having a viscosity greater than 5,000 centistokes at 25°C. The silicone polymer improves the rheology of the coating composition and allows for efficient leveling and bubble suppression of the coating film on the substrate during curing. A secondary crosslinking reaction may also occur between the silicone polymer and the urethane prepolymer due to the presence of about 0.5% of free hydroxyl groups in the silicone. This type of crosslinking is believed to contribute to the formation of a slick coating surface which prevents materials from adhering to it. This is advantageous in some areas of coating applications such as in hopper car linings to ease the discharge of the material being freighted. It is also advantageous where "graffiti" resistance is desired. The coating decidedly minimizes the adhesion of pen, ink, crayon markings or spray paint on to its surface.

The urethane prepolymer component is an elastomeric isocyanate-terminated urethane prepolymer comprising the reaction product of organic polyisocyanates and polyol esters of ricinoleic acid. The amount of free isocyanate groups in the prepolymer is from about 5 to 30% by weight. Thus, when the two components are mixed the hydroxyl groups of the polymeric resins in the functional polymer component form a urethane reaction product with the isocyanate groups of the prepolymer which is completed on curing.

Solvents are preferably added to the functional polymer component to enable efficient application of the coating composition to substrate materials and in maintaining uniform films on the substrate during curing. These solvents are used with the functional polymer component to provide homogeneous mixing of the polymeric resins with the urethane prepolymer. The solvents are also used to adjust the viscosity or density of the composition as required for a particular method of application. Thus airless spraying of the composition requires a lower viscosity than conventional spraying which in turn is lower than for brushing or rolling. The basic requirements for the solvent are that it be inert to the functional polymer component, the prepolymer and the cured product and be capable of complete evaporation from the coating composition within about 48 hours.

Among these solvents include lower alkyl ketones having up to 8 carbon atoms such as acetone, methyl ethyl ketone, methyl-n-butyl-ketone, methyl isobutyl ketone, acetone, methyl amylketone, cyclohexanone and 4-methoxy-4-methyl pentane-2-one; aromatic hydro-carbon solvents containing up to 10 carbon atoms such as xylene, toluene, ethyl benzene and pseudocumene; organic esters containing up to 8 carbon atoms such as ethyl acetate, propylacetate, butyl acetate and cellosolve acetate; and mixtures thereof.

The coating composition of this invention can also be pigmented by adding a pigment such as titanium dioxide to either the functional polymer component or urethane prepolymer component to provide sufficient hiding. In addition an array of colored coatings can be made by incorporating other pigment additives or tinting agents in the composition.

The amount of alkyd used in the functional polymer component is generally from 30 to 80% of the weight of the vinyl copolymer. If a silicone oil is to be employed it should generally comprise from 2 to 20% by weight of the vinyl copolymer. The amount of solvent for the functional polymer component may vary according to the desired viscosity of the coating composition. However, generally a range of from 1 to 3 parts of solvent by weight for each part of functional polymer component is sufficient for most mechanical applications of the coating to the substrate such as brushing or rolling.

Sufficient amounts of urethane prepolymer are used to provide a molar ratio of isocyanate groups in the prepolymer to hydroxyl groups in the polymeric resins of from about 1.0/₁ to 5.0/₁ and preferably from 2.0/₁ to 3.5/₁ for excellent curing and performance properties of the coating.

The instant coating composition can be applied to most any substrate by dipping, rolling or brushing to form an adhesive coating.

For example, application of the coating to a cementitious material such as porous brick forms a glazed, hard and durable coating. Both ferrous metals such as sand blasted steel or cold rolled steel and non-ferrous metals such as magnesium and aluminum can also be coated using the instant coating composition to form a highly durable, impact and abrasion resistant coating. On hard woods and soft woods the cured coating forms an adhesive, highgloss protective finish.

The functional polymer component is prepared by forming a solution of the partially hydrolyzed vinyl acetate-vinyl chloride copolymer in a solvent; adding the alkyd to said solution to form the functional polymer component; and mixing the urethane prepolymer component with the so-formed functional polymer component. The resulting coating composition is then ready for application to substrate surfaces.

If the silicone oil is to be included in the functional polymer component it is preferably added together with the alkyd or after the alkyd is added. If a pigment is to be added, a portion of vinyl copolymer is first dissolved in a portion of the solvent. The pigment is then dispersed in this solution under strong agitation until a uniform dispersion is formed as for example to a 5 reading on a Hegman Grind Guage. The remaining vinyl copolymer and solvent is added to the pigment dispersion under strong agitation followed by addition of alkyd and silicone oil, if desired, as described above. Procedures may vary for dispersing the pigment in the polymer-solvent combination, as well known to those skilled in the coating art.

The above procedure is only given by way of example. In some cases it may be possible to add all pigment to the solventvinyl copolymer solution depending on the amount of pigment, type of solvent and dispersing equipment.

After forming the coating composition it is applied to substrate surfaces in any manner known to the art as for example, brushing, rolling, dipping or blading on the substrate surfaces. After about 48 hours of curing at ambient temperatures all solvents are released and the reaction between the hydroxyl groups of the polymeric resins and the isocyanate groups of the urethane prepolymer is completed.

The curing can of course be accelerated by employing high temperatures or by employing metal catalyst salts such as tin octoate or amine catalysts.

In another embodiment of this invention, a sprayable coating composition, is produced by the addition of pseudocumene and the silicone oil. The pseudocumene must be included as a solvent for the functional polymer along with other solvents such as the ketone and organic esters in an amount of from about 15 to 55% by weight of total solvents. The total weight of solvents should be from 1.5 to 3.0 times the weight of functional polymer component. The silicone oil must also be added to the functional polymer component as described above in an amount from 2% to 20% by weight of the vinyl copolymer. The coating composition can then easily be applied to substrates by spraying such as by conventional, airless or electrostatic spraying. The pseudocumene and silicone oil enhance sprayability and allow efficient bubble release from the sprayed film. The organic esters and ketones help hold the sprayed film open so as to allow uniform solvent release thereby preventing film discontinuity or cracking during curing. This embodiment of the instant coating composition also achieves "Good wrap around" is a term which applies to the ability of a sprayed film to lap around curved or irregular surfaces so that the position of the spray nozzle need not be constantly moved to insure covering of these surfaces.

In still another embodiment of this invention, a storable coating composition is provided having excellent shelf-life wherein the functional polymer component and urethane prepolymer component are pre-mixed and stored together indefinitely without any reaction between the components. This is accomplished by reacting blocking groups with the isocyanate groups of the urethane prepolymer. The resulting blocked-isocyanate groups are thus rendered incapable of reacting with the hydroxyl groups of the polymeric resins. The composition can be packaged and stored indefinitely until ready for application. The blocking groups are removed by heating the composition form about 250°C to 325°C after coating the substrate whereafter the "free" isocyanate groups begin to react with the hydroxyls of the polymeric resins. Among such blocking groups include phenol, lower alkyl ketoximes having up to 6 carbon atoms such as 2-butanone oxime and lower alkyl aldoximes having up to 6 carbon atoms such as butyraldoxime.

DESCRIPTION OF THE PREFERRED EMBODIMENTS

The partially hydrolyzed vinyl-chloride vinyl acetate copolymers of this invention are those which have a degree of hydrolysis such that the resin contains by weight from 70 to 96.5% combined vinyl chloride, from about 2 to about 20% combined vinyl alcohol and from 1.5 to about 25% combined vinyl acetate. These copolymers and their preparation are described in more detail in U.S. Pat. No. 2,512,726 issued June 27, 1950. The preferred partially hydrolyzed vinyl chloride-vinyl acetate copolymer is one having 3 percent by weight of combined vinyl acetate and about 6% by weight of combined vinyl alcohol. Useful molecular weights for the vinyl copolymer range from 5,000 to 25,000.

By virtue of the hydroxyl functionality of the vinyl alcohol groups of the copolymer, a reaction occurs between the hydroxyl groups and some of the isocyanate groups of the urethane prepolymer to form urethane bonds.

The preferred alkyds of the invention are oil-free and have an average equivalent weight of at least 1000 and preferably between 1000 and 1500. The alkyd must also contain at least one percent by weight of hydroxyl groups to serve as a reactant with the urethane prepolymer. Low water content and low acid number of the alkyd is also preferred. Particularly preferred is a linear saturated oil-free alkyd having an average equivalent weight of 1300 and which contains about from 1 to 2 percent of hydroxyl groups by weight.

It is also preferred to add a plasticizer to the alkyd which will enhance the flexibility of the alkyd and in turn the final cured coating of this invention. The preferred plasticizer is a copolymer of butyl acrylate and vinyl isobutyl ether contained as a 50% solution in ethyl acetate. The amount of plasticizer required is generally about 0.2% of the weight of the alkyd. The hydroxyl groups of the alkyd reacts with some of the isocyanate groups of the urethane prepolymer to form additional urethane linkages.

The high molecular weight silicone preferred in this invention is a 100% dimethyl silicone polymer having a viscosity of 60,000 Ctks. at 25°C. The invention is not limited to this silicone polymer and any silicone polymer can be used which has a viscosity of from 5000 Ctks. to 100,000 Ctks. at room temperature and preferably from 60,000 to 80,000 Ctks. at 25°C. In addition siliconized resins such as siliconized alkyds or acrylics having the desired viscosity may also be employed as a silicone polymer for the invention.

It is also preferred to use a silicone polymer having available at least 0.5% of hydroxyl groups by weight to serve as a further reactive material with the urethane prepolymer.

The urethane prepolymer component of this invention comprises an isocyanate terminated urethane prepolymer made by reacting an organic polyisocyanate and a polyol ester of ricinoleic acid.

By "organic polyisocyanate" is meant organic compounds containing two or more isocyanate (NCO) groups. This definition also includes polymeric organic polyisocyanates which are polyisocyanates of organic polymers, such as polymeric diphenyl methane diisocyanate and toluene diisocyanate.

By "polyol ester" is meant ricinoleic acid-esters prepared by reacting ricinoleic acid with alcohols having at least two hydroxyl groups. The esterification may be complete or partial; that is the polyol hydroxyls may have all reacted wtih ricinoleic acid such as in the case of castor oil, the triglyceryl ester of ricinoleic acid or propylene glycol diricinoleate, or a fraction of the polyol hydroxyls may have reacted, such as in the case of propylene glycol mono ricinoleate or ethylene glycol mono ricinoleate. Mixtures of the ricinoleate esters may also be employed.

Suitable polyisocyanates include toluene diisocyanate, hexamethylene diisocyanate, isophorone diisocyanate, diphenyl methane 4,4' diisocyanate, and trimethyl hexamethylene diisocyanate and mixtures thereof. Other isocyanates, either alone or in admixture, may also be used to vary the durability, nonyellowing and physicochemical properties of the coating.

The urethane prepolymer should contain from about 5 to 30% free isocyanate groups by weight and preferably from 15 to 25% by weight. If less than 5% NCO groups are present the cured film will be too inflexible. If greater than about 30% NCO groups are present, these excess NCO groups may react with moisture and destroy the coating film properties. The solvents or solvent mixtures which are employed in this invention can be used in varying amounts depending on the viscosity desired. When using aromatic solvents it is preferred to combine them with ketonic solvents or organic esters in order to efficiently dissolve the vinyl copolymer.

The amount of alkyd preferred in the functional polymer component should generally be from about 30 to 80% by weight of the vinyl copolymer and preferably about 50%. If below about 30% is employed, the flexibility of the cured film may be diminished. If greater than about 80% is used, the coating generally may not cure to a hard and durable finish.

The urethane prepolymer should be present in the composition in sufficient amounts to provide a molar NCO to OH ratio of from about $1.0/_1$ to $5.0/_1$ and preferably from about 2.0/1 to 3.5/1. At less than about 1.0/1 ratio there will not be complete reaction with the polymeric resins. At ratios greater than about 5.0/1, no real advantage in coating properties is gained. There may even be a detrimental effect on film properties due to side reactions which may occur between the excess isocyanate groups and other functional groups in the polymeric resins.

If a silicone oil is to be employed in the functional polymer component it should comprise from about 2 to 20% of the weight of the vinyl copolymer and preferably from 6 to 10%. Amounts of silicone oil less than about 2% render it ineffective in suppressing bubble formation in the coated film. Amounts greater than about 20% may diminish hardness of the coating.

The cured coating on the substrate is the reaction product of the polymeric resins containing hydroxyl functionality and the urethane prepolymer. Where the composition also contains the silicone oil it remains in the cured coating. Any hydroxyl groups contained in the silicone oil also react with the isocyanate groups of the urethane prepolymer.

In order to more fully describe the instant invention the following examples are given:

EXAMPLE 1

This example illustrates the preparation of a coating composition wherein the functional polymer component comprises 14% vinyl copolymer, 7% linear saturated polyester, 61.5% solvents and 17.5% pigment by weight. The urethane prepolymer component contained 21% by weight of free NCO groups and the molar ratio of NCO in the urethane prepolymer to OH in the polymeric resins of the functional polymer component was about 2.5/1.

A partially hydrolyzed vinyl acetate-vinyl chloride copolymer containing approximately 91% by weight of combined vinyl chloride, 3% by weight of combined vinyl acetate and 6% by weight of combined vinyl alcohol, 12.5 parts, was dissolved in 6.1 parts of methyl isobutyl ketone. To this solution was dispersed 15.5 parts of titanium dioxide pigment under strong agitation until a sample of this dispersion showed a No. 5 reading on a Hegman Grind Guage. To this dispersion was added a solution of 11.25 parts of additional vinyl copolymer in 14.3 parts of methyl isobutyl ketone under strong agitation. To this dispersion was added 6.2 parts of a linear saturated oil-free alkyd having an equivalent weight of 1300 and containing about 1 to 1.5% of hydroxyl groups by weight. Xylene, 20.9 parts and cellosolve acetate, 13.5 parts were also added to the dispersion to form the functional polymer component. To this component was added 10.1 parts of an isocyanate terminated urethane prepolymer (Vorite 626-M-1, N L Industries, Inc.), made by reacting castor oil and a polyol ester of ricinoleic acid with organic polyisocyanates, to provide 21% by weight of free isocyanate groups. The mixture was then stirred until a homogeneous composition was achieved. The resulting composition was then brushed onto sand blasted steel panels and allowed to cure for about 48 hours. The coated film after curing contained the reaction product of the vinyl copolymer and linear saturated alkyd with the urethane prepolymer component. The coating contained 28.3% of combined vinyl copolymer, 14% of combined linear saturated polyester, 22.7% of combined urethane prepolymer and 35.2% of pigment by weight. To compare the instant coating with other pigmented coatings known in the art for their durability properties, four sand-blasted steel panels were respectively coated with a paint formulation containing a non-hydrolyzed vinyl chloride-vinyl acetate copolymer, (Vinyl), a vinyl urethane coating made by reacting a hydrolyzed vinyl chloride-vinyl acetate copolymer with a polyol diisocyanate, (Vinyl Urethane), a polyol urethane coating, (Polyol Urethane), and a polyamide catalyzed epoxy coating, (Epoxy). None of the above pigmented coatings contained the alkyd or urethane prepolymer of this invention. Reverse Impact Tests after one week aging, Abrasion Falling Sand, Slip, Rockwell Hardness and Gardner Adhesion Tests were performed on all coatings.

Table 1 below summarizes the results.

TABLE 1

| Coating | Aged Reverse Impact (in-lbs.) | Abrasion Falling Sand(1/mil) | Slip 1-Best 5-Worst | Rockwell Hardness | Gardner Adhesion |
|---|---|---|---|---|---|
| Example 1 | Pass 160 | 72.2 | 1 | 2000 | 5000 |
| Vinyl | Pass 160 | 28.0 | 5 | 1200 | 3000 |
| Vinyl Urethane | Fail 20 | 26.4 | 3 | 2000 | 4800 |
| Polyol Urethane | Fail 20 | 25.0 | 4 | 2000 | 5000 |
| Epoxy | Fail 20 | 55.0 | 2 | 2000 | 5000 |

As the table shows the instant coating was superior to all other coatings in the aged Reverse Impact Test except the Vinyl coating which showed equal performance. Resistance to abrasion as shown in the results of the Abrasion Falling Sand Test and Slip test reveals that the instant composition is superior to all other coatings tested. In hardness and adhesion, the instant composition shows equal or better performance than the other coatings.

The coating composition was applied to a cementitious substrate, namely a porous brick substrate. A glazed-tile coating was formed after curing which had a hardness similar to that coated in sand-blasted steel in Example 1. The brick was immersed in a tank full of fresh water. After an extended period of immersion the coating was essentially uneffected, and had excellent adhesion and abrasion resistance.

EXAMPLE 2

This example illustrates the cure properties of the instant composition. A clear coating composition was prepared using the procedure of Example 1 except without addition of pigment. The vinyl copolymer of Example 1, 12.5 parts was dissolved in 20.4 parts of methyl isobutyl ketone followed by the addition of linear alkyd to this solution. The remainder of the procedure of Example 1 was used to form the clear coating composition. (Example 1 clear). This composition was then coated on a sand-blasted steel panel. For comparison a clear epoxy coating was applied to a steel panel (Epoxy Clear). The pigmented coating of Example 1 and the pigmented epoxy coating of Example 1 (Epoxy) were also coated on sand-blasted steel panels. Sward Hardness measurements were taken of the four compositions after curing for 1, 3, 7, 14 and 30 days. The clear coating composition of this example after curing contained 43% of combined vinyl polymer, 22% of combined linear saturated alkyd and 35% of combined urethane prepolymer.

Table 2 below summarizes the cure properties of the coatings.

isobutyl ether in ethyl acetate was used with the alkyd. In all cases the amount of alkyd was 50% of the weight of the vinyl copolymer and the ratio of NCO in the urethane prepolymer to total OH in the vinyl copolymer and the alkyd was about $3.1/_1$.

The compositions were prepared by dissolving about 10% of the vinyl copolymer in a portion of the solvents (about 20% of total solvents by weight). To this solution was added all of the pigment under high shear until the pigment was completely dispersed. The remaining vinyl copolymer was then added together with the remaining solvents. Next the linear saturated alkyd containing the plasticizer was added to form the functional polymer component. Finally, the urethane prepolymer was added to form the coating composition. Table 3 summarizes the types and amounts of all items in the composition.

TABLE 3

| | Item | Example 3 lbs. | Example 3 Gals. | Example 4 lbs. | Example 4 Gals. | Example 5 lbs. | Example 5 Gals. |
|---|---|---|---|---|---|---|---|
| 1. | Vinyl Copolymer | 100.0 | 8.64 | 100.0 | 8.64 | 100.0 | 8.64 |
| 2. | TiO$_2$ Pigment (Rutile) | 125.0 | 2.93 | 125.0 | 2.93 | 125.0 | 2.93 |
| 3. | Gellant (Bentone 38, NL Industries, Inc.) | | | | | 5.0 | 0.59 |
| 4. | Alkyd | 50.0 | 5.04 | 50.0 | 5.04 | 50.0 | 0.59 |
| 5. | Plasticizer | 1.2 | 0.16 | 1.2 | 0.16 | 1.2 | 0.16 |
| 6. | Urethane Prepolymer | 103.3 | 11.00 | 107.3 | 11.00 | 107.3 | 11.00 |
| 7. | Methyl Isobutyl Ketone | | | 126.0 | 18.88 | 126.1 | 18.88 |
| 8. | Methyl Ethyl Ketone | 145.7 | 21.71 | 42.7 | 6.36 | 42.7 | 6.36 |
| 9. | Cellosolve Acetate | 145.7 | 17.99 | 42.7 | 5.27 | 100.3 | 11.15 |
| 10. | Toluene | 36.4 | 5.04 | 94.3 | 13.06 | 94.4 | 13.06 |
| 11. | Butyl Acetate | 36.4 | 4.97 | 10.7 | 1.46 | 10.7 | 1.46 |
| 12. | 4-Methoxy-4-Methyl Pentane-2-One | | | 47.6 | 6.33 | | |
| 13. | High Flash Naphtha | 189.3 | 26.22 | 189.3 | 26.22 | 189.3 | 26.22 |
| | TOTAL | 933.0 | 103.70 | 936.8 | 105.35 | 952.0 | 101.04 |

TABLE 2

| | SWARD HARDNESS | | | |
|---|---|---|---|---|
| Time | Example 1 Clear | Epoxy Clear | Example 1 Pigmented | Epoxy Pigmented |
| 1 day | 16 | 28 | 22 | 12 |
| 3 days | 50 | 40 | 50 | 26 |
| 7 days | 60 | 44 | 50 | 36 |
| 14 days | 60 | 44 | 50 | 38 |
| 30 days | 60 | 44 | 43 | 48 |

As the example shows, the instant compositions after approximately 3 days curing time formed a hard and durable coating film far superior than the Epoxy coatings. In addition the hardness of the film is maintained at high levels over one month of curing.

The clear coating of this example (Example 1 clear) was applied to a wood surface and cured. A high-gloss, clear protective finish was formed which had excellent abrasion resistance, scuff resistance and adhesion. A Sward Hardness of 60 was attained after 1 week aging.

EXAMPLES 3–5

In these examples, pigmented coating compositions were prepared using an array of solvent compositions. The vinyl copolymer, linear saturated alkyd and urethane prepolymer of Example 1 were used in all coating compositions. In addition, a plasticizer comprising a 50% solution of a copolymer of butyl acrylate and vinyl All compositions were brushed on steel panels and allowed to cure for 48 hours. The cured coatings all had similar properties to the pigmented coating of Example 1.

EXAMPLE 6

In this example, a pigmented coating composition was prepared containing 7% of a silicone oil based on the weight of vinyl copolymer.

The procedure of Example 1 was followed except 0.9 parts of a 100% dimethyl silicone oil having a viscosity of 60,000 Ctks. at 25°C was added to the dispersion along with the linear saturated alkyd.

The formed coating was then brushed onto a magnesium metal surface and allowed to cure. The silicone oil imparted excellent bubble-releasing properties to the coated film during curing. After curing, impact and abrasion resistance of the coating were tested and found to be comparable to the pigmented coating of Example 1. The cured coating was adhesive, uniform, hard and resistant to scarring and chipping after being subjected to contact with a high velocity object.

EXAMPLE 7

This example illustrates the preparation of a clear coating composition comprising the vinyl copolymer and linear saturated alkyd of Example 1, the silicone oil of Example 6, and solvent mixtures. The urethane prepolymer of Example 1 was added after combining the above materials to form the coating composition.

The amount of linear saturated alkyd used was 80% by weight of the vinyl copolymer; the amount of silicone oil was 20% of the vinyl copolymer; and the ratio of NCO in the urethane prepolymer to total OH in the vinyl copolymer, alkyd and silicone was about $1.10/_{1.00}$.

The coating composition was prepared by adding the vinyl copolymer under agitation to approximately 70% of the total solvents to form a solution. Then the remaining solvents were added to this solution followed by the linear saturated alkyd and silicone oil. The urethane prepolymer was then added using moderate agitation.

The coating composition is given below:

| Item | Parts by Weight |
|---|---|
| 1. Vinyl Copolymer | 50 |
| 2. Linear Saturated Alkyd | 40 |
| 3. Silicone Oil | 10 |
| 4. Urethane-Prepolymer | 20 |
| 5. Xylene | 72.4 |
| 6. Methyl Isobutyl Ketone | 104.7 |
| 7. Pseudocumene | 29.9 |
| 8. Cellosolve Acetate | 31.8 |
| 9. 4-Methoxy-4-Methyl Pentane-2-One | 5.6 |

The coating composition was applied to a cold-rolled steel substrate and allowed to cure at room temperature for 48 hours. After 1 week of aging the impact resistance of the coating as measured by Reverse Impact Test was 160 in-lbs. Abrasion Falling Sand measurements after 1 week was 35 liter/mil; and after 5 weeks it increased to 49 liter/mil.

EXAMPLE 8

This example illustrates the preparation of a coating composition wherein the alkyd comprises 25% of the vinyl copolymer and the silicone oil comprises 6% of the vinyl copolymer; and wherein the rate of NCO in the urethane polymer to OH in the functional polymer component is about $4.8/_1$.

Following the procedure of Example 7, a coating was prepared having the following composition:

| Item | Parts by Weight |
|---|---|
| 1. Vinyl Copolymer | 75 |
| 2. Linear Saturated Alkyd | 20 |
| 3. Silicone Oil | 5 |
| 4. Urethane-Prepolymer | 110 |
| 5. Xylene | 72.4 |
| 6. Methyl Isobutyl Ketone | 166.4 |
| 7. 4-Methoxy-4-Methyl Pentane-2-One | 5.6 |

The composition was brushed onto cold rolled steel panels and cured for 48 hrs. After 1 week aging, Impact Resistance was 160 in-lbs. as measured by the Reverse Impact Test; Abrasion resistance was 56 L./mil as measured by the Falling Sand Abrasion Test.

EXAMPLE 9

Following the procedure of Example 1, a coating composition was prepared wherein the reaction product of castor oil and a polymeric diphenyl methane diisocyanate (Mondur MRS, Mobay Chemical Company) was substituted for the urethane prepolymer of Example 1.

The amount of free isocyanate groups were the same as in the urethane prepolymer of Example 1 (21%).

The coating composition thus formed was coated on a metal substrate and cured at ambient temperature for 48 hrs.

The results of impact and abrasion resistance after curing was similar to the coating of Example 1.

EXAMPLES 10-11

These examples illustrate the formation of a storable coating composition in which the urethane prepolymer contains aliphatic oxime-blocked isocyanate groups.

Exactly 88 g. of a 2-butanone oxime was added with stirring at ambient temperature to 200 g. of the urethane prepolymer described in Example 1. This amount of oxime constituted a 1% molar excess with respect to the isocyanate groups of the prepolymer. After the addition, the oxime blocked urethane prepolymer was cooled and 73.7 g. of it was added to a functional polymer component comprising 64 g. of vinyl copolymer and 32 g. of linear alkyd dissolved in a mixture of methyl amyl ketone and cellosolve acetate. A homogeneous composition resulted which was stored in a metal container. After 2 months storage, there was no indication of any reaction between the components. The composition was then applied to a cold-rolled steel substrate, and heated to a temperature of about 275°F for 15 minutes to drive off the oxime blocking group. The cured coating had similar abrasion and impact resistance to the clear coating of Example 2.

In a similar experiment, 88 g. of butyraldoxime was substituted for the 2-butanone oxime described above, to prepare another oxime blocked urethane prepolymer. Another coating composition was prepared, stored for 2 months, and coated on a sandblasted steel substrate. After removal of the oxime blocking group by heating, the cured coating was identical in abrasion and impact resistance to the clear coating of Example 2 and the pigmented coating of Exammple 1.

EXAMPLE 12

This example illustrates the preparation of a "sprayable" composition of the instant invention wherein pseudocumene, a silicone oil and oxygenated solvents are employed in forming the functional polymer component.

The vinyl copolymer, linear saturated alkyd and urethane polymer used herein is described in Example 1. The silicone oil is described in Example 6.

Following the procedure of Examples 3–6 a pigmented coating composition was formed having the following composition:

| Item | Parts by Weight |
|---|---|
| 1. Vinyl Copolymer | 12.5 |
| 2. Alkyd | 6.2 |
| 3. Silicone Oil | 0.9 |
| 4. Pigment (TiO$_2$) | 15.5 |
| 5. Urethane Prepolymer | 10.1 |
| 6. Pseudocumene | 20.9 |
| 7. Methyl Isobutyl Ketone | 20.4 |
| 8. Cellosolve Acetate | 13.5 |
| | 100.0 |

Approximately 41 gallons of this coating composition was applied to the inside of a railroad hopper car which had been previously sand-blasted. Using an airless spray gun at a gun pressure of about 2800 psi. a light mist, fog coat referred to as a tack coat was first applied. This was followed by a single-pass one-coat application. Finally, a top cross-coat was applied and allowed to cure. The coating dried satisfactorily without sagging, blistering or bubble entrapment. Wrap-around was excellent. Film properties and cure porperties were comparable to laboratory applied coatings in slip, hardness, abrasion resistance and impact resistance (see Examples 1 and 2).

EXAMPLE 13

A coating composition was prepared using the procedure of Example 1 except that 10.6 parts of a urethane prepolymer prepared as follows was employed:

18.9 parts of castor oil reacted with 76.1 parts of toluene diisocyanate and extended with 38.3 parts of polypropylene glycol (m. w. 420) to provide 20% by weight of free isocyanate groups.

The resulting coating composition was applied to steel panels and after air drying was tested for reverse impact after 3 days of aging. The results indicated 160 in-lbs.

EXAMPLE 14

A coating composition was prepared using the procedure of Example 1 except that 10.6 parts of a urethane prepolymer prepared as follows was employed:

16.8 parts of a mixed ester of ricinoleic acid (Polycin-51, N L Industries, Inc.) reacted with 73.2 parts of toluene diisocyanate and extended with 34.1 parts of polypropylene glycol (m. w. 420) to provide 20% by weight of free isocyanate groups.

The resulting coating composition was applied to steel panels and after air drying was tested for reverse impact after 3 days of aging. The results indicated 160 in-lbs.

EXAMPLE 15

A coating composition was prepared using the procedure of Example 1 except that 13.1 parts of a urethane prepolymer prepared as follows was employed:

10.5 parts of a mixed ester of ricinoleic acid (Polycin-51, N L Industries, Inc.) reacted with 75 parts of polymeric polymethylene polyphenyl diisocyanate and extended with 21.3 parts of polypropylene glycol (m. w. 420) to provide 16.2% by weight of free isocyanate groups.

The resulting coating composition was applied to steel panels and after air drying was tested for reverse impact after 3 days of aging. The results indicated 160 in-lbs.

I claim:

1. A curable coating composition comprising a mixture of:
   a. a partially hydrolyzed vinyl chloride-vinyl acetate co-polymer;
   b. an alkyd containing at least 1% hydroxyl groups by weight; and
   c. a urethane prepolymer terminated with free isocyanate groups comprising the reaction product of an organic polyisocyanate and a polyol ester of ricinoleic acid.

2. The coating composition of claim 1 which further comprises a silicone oil having a viscosity of at least 5000 ctks. at 25°C.

3. The coating composition of claim 1 which further comprises a solvent.

4. The coating composition of claim 1 wherein said composition further comprises a pigment.

5. The coating composition of claim 1 wherein said isocyanate groups are blocked with a blocking agent selected from the group consisting of phenol, lower alkyl ketoximes having up to 6 carbon atoms and lower alkyl aldoximes having up to 6 carbon atoms.

6. A curable coating composition comprising a mixture of:
   a. a partially hydrolyzed vinyl chloride-vinyl acetate copolymer containing from about 2 to about 20% by weight of combined vinyl alcohol and from 1.5 to 25% by weight of combined vinyl acetate;
   b. an alkyd containing at least 1% hydroxyl groups by weight and having a molecular weight of at least 1000;
   c. a solvent; and
   d. a urethane prepolymer terminated with from 5% to 30% by weight of isocyanate groups; said prepolymer comprising the reaction product of an organic polyisocyanate and a polyol ester of ricinoleic acid; wherein the ratio of NCO in said urethane prepolymer to total OH in said copolymer and alkyd is from 1.0/1 to 5.0/1.

7. The coating composition of claim 6 which further comprises a silicone oil having a viscosity of at least 5000 ctks. at 25°C.

8. The coating composition of claim 6 wherein said alkyd further comprises a plasticizer.

9. The coating composition of claim 6 which further comprises a pigment.

10. The coating composition of claim 6 wherein the amount of alkyd is from 30 to 80% of the weight of said vinyl copolymer.

11. The coating composition of claim 6 wherein said solvent is selected from the group consisting of lower alkyl ketones having up to 8 carbon atoms, aromatic hydrocarbons having up to 10 carbon atoms, organic esters having up to 8 carbon atoms and mixtures thereof.

12. The coating composition of claim 6 wherein said isocyanate groups contain a blocking agent selected from the group consisting of phenol, alkyl ketoximes having up to 6 carbon atoms and alkyl aldoximes having up to 6 carbon atoms.

13. A curable coating composition comprising a mixture of:
   a. a partially hydrolyzed vinyl chloride-vinyl acetate copolymer containing about 6% of combined vinyl alcohol and about 3% of combined vinyl acetate by weight.
   b. A linear saturated oil-free alkyd containing from about 1 to 2% hydroxyl groups by weight and having a molecular weight of about 1300; the amount of said alkyd being about 50% by weight of said vinyl copolymer;
   c. a solvent selected from the group consisting of lower alkyl ketones having from 3 to 8 carbon atoms, aromatic hydrocarbons having up to 10 carbon atoms, organic esters having up to 8 carbon atoms and mixtures thereof; and
   d. a urethane prepolymer terminated with about from 5 to 30% of NCO groups by weight; said prepolymer being the reaction product of an organic polyisocyanate and a polyol ester of ricinoleic acid; wherein the ratio of NCO in said urethane prepolymer to total OH in said vinyl copolymer and polyester is from 1.0/1 to 5.0/1.

14. The coating composition of claim 13 which further comprises from 2 to 20% of a dimethyl silicone oil based on the weight of said vinyl copolymer; said oil having a viscosity of about 60,000 ctks. at 25°C.

15. The coating composition of claim 13 which further comprises a titanium dioxide pigment.

16. The coating composition of claim 13 wherein said solvent comprises from 15 to 55% of pseudocumene.

17. The coating composition of claim 13 wherein said isocyanate groups are blocked with a blocking agent selected from the group consisting of 2 - butanoneoxime and butyraldoxime.

18. A substrate coated with the reaction product of:
 a. a partially hydrolyzed vinyl chloride-vinyl acetate copolymer and an alkyd; said alkyd containing at least 1% hydroxyl groups by weight; and
 b. a urethane prepolymer terminated with isocyanate groups; said prepolymer comprising the reaction product of an organic polyisocyanate and a polyol ester of ricinoleic acid.

19. The substrate of claim 18 wherein said reaction product further comprises a silicone oil having a viscosity of at least 5000 ctks. at 25°C.

20. A sprayable coating composition comprising a mixture of:
 a. a partially hydrolyzed vinyl chloride-vinyl acetate copolymer;
 b. an alkyd containing at least 1% by weight of hydroxyl groups and having a molecular weight of at least 1000;
 c. a silicone oil having a viscosity of at least 5000 ctks. at 25°C;
 d. a solvent containing from 15% to 55% by weight of pseudocumene; and
 e. a urethane prepolymer terminated with isocyanate groups; said prepolymer comprising the reaction product of an organic polyisocyanate and a polyol ester of ricinoleic acid; wherein the molar ratio of NCO in said urethane prepolymer to total OH in said copolymer, alkyd and silicone oil is from 1.0/1 to 5.0/1.

* * * * *